United States Patent Office 3,019,255
Patented Jan. 30, 1962

3,019,255
ETHYL BIS-(2-CHLOROPROPYL)CARBAMATE
Harry Charles Murfitt, London, England, assignor to Burroughs Wellcome & Co. (U.S.A.) Inc., Tuckahoe, N.Y., a corporation of New York
No Drawing. Filed Dec. 24, 1957, Ser. No. 704,874
Claims priority, application Great Britain Jan. 3, 1957
1 Claim. (Cl. 260—482)

The present invention relates to a novel product having pharmacological activity in retarding unnatural cell multiplication.

In studying the effect of a series of compounds related to urethan and nitrogen mustards on transplanted tumors it has been found that the compound ethyl bis(2-chloropropyl) carbamate having the formula

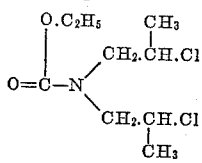

has an outstanding activity against the transplanted Walker tumor in rats which is higher than that of urethan. It has a lower toxicity than that of known analogues and there is no evidence of its having the severe haemopoietic toxicity of nitrogen mustard (bis(2-chloroethyl)methylamine).

According to the present invention therefore there is provided the compound ethyl bis(2-chloropropyl) carbamate and its administration in retarding immature cell multiplication.

Conveniently the compound may be prepared according to the following scheme of reactions:

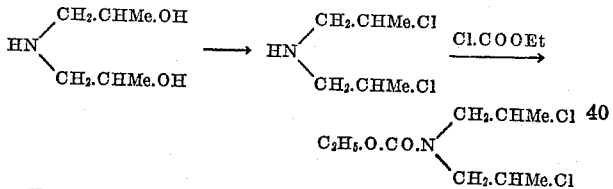

For the first step any suitable chlorinating agent such as phosphoryl chloride or thionyl chloride may be used.

The compound may be presented in any suitable pharmaceutical preparation. As it is a liquid, unit dosage is most conveniently presented in gelatin capsules. The dosage required is in the range 0.5–5.0 grams daily.

The invention will now be described with reference to the following examples in which all temperatures are given in degrees centigrade.

EXAMPLE 1

Bis-(2-chloropropyl)amine hydrochloride

A solution of thionyl chloride (936 gms.) in chloroform (600 cc.) was slowly added to a refluxing mixture of diisopropanolamine (300 gms.) in chloroform (900 cc.). When addition was complete the mixture was refluxed for a further 2 hours. The mixture was cooled and the solid filtered off. A second crop was obtained by concentrating the mother liquors. The crude material was recrystallized from 50% ethanol acetone mixture giving 229 gms. (49% of theory) of bis-(2-chloropropyl)-amine hydrochloride, melting point 210–211°.

Ethyl bis-(2-chloropropyl)carbamate

A mixture of bis-(2-chloropropyl)amine hydrochloride (413 gms.) and chloroform (1.75 l.) was stirred while triethylamine (275 cc.+135 cc.+170 cc.) and ethyl chloroformate (100 cc.+51 cc.+135 cc.) were added alternately in the portions given. The temperature was maintained below 40° by cooling. When addition was complete the mixture was stirred for a further 2 hours. The mixture was then extracted with water followed by 10% hydrochloric acid. The chloroform layer was then washed thoroughly with water until the washings were free from chloride. The chloroform layer was dried with anhydrous sodium sulphate, filtered and the chloroform evaporated off. The residue was vacuum distilled giving 398 gms. (82% of theory) of ethyl bis-(2-chloropropyl) carbamate, boiling point 110–113°/2–3 mm. Hg.

EXAMPLE 2

A little arachis oil was added to ethyl bis-(2-chloropropyl)-carbamate to form a solution containing drug at 1 g./ml. The solution was put into soft gelatin capsules, each containing 0.5 ml. of liquid.

What I claim is:
Ethyl bis-(2-chloropropyl)carbamate.

References Cited in the file of this patent
UNITED STATES PATENTS

| | | |
|---|---|---|
| 2,677,698 | Duetschman | May 4, 1954 |
| 2,876,159 | Sunderman | Mar. 3, 1959 |
| 2,884,444 | Berger | Apr. 28, 1959 |
| 2,899,358 | Sperber | Aug. 11, 1959 |

OTHER REFERENCES

Skipper et al.: Journal of The National Cancer Institute, vol. 9, No. 2, pages 77–88 (October 1948).

Wagner et al.: Synthetic Organic Chemistry (1953), page 646.